US012615531B2

(12) United States Patent　　(10) Patent No.:　US 12,615,531 B2
Sha et al.　　　　　　　　　　　　(45) Date of Patent:　　Apr. 28, 2026

(54) MEASUREMENT REPORTING FOR NETWORK MAINTENANCE METHODS AND SYSTEMS

(71) Applicant: ZTE Corporation, Shenzhen (CN)

(72) Inventors: Xiubin Sha, Shenzhen (CN); Bo Dai, Shenzhen (CN); Ting Lu, Shenzhen (CN); Xu Liu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 371 days.

(21) Appl. No.: 17/213,964

(22) Filed: Mar. 26, 2021

(65) Prior Publication Data

US 2021/0219163 A1　　Jul. 15, 2021

Related U.S. Application Data

(63) Continuation of application No. PCT/CN2018/108055, filed on Sep. 27, 2018.

(51) Int. Cl.
*H04W 24/10*　　　　(2009.01)
*H04W 24/04*　　　　(2009.01)
(Continued)

(52) U.S. Cl.
CPC ........... *H04W 24/10* (2013.01); *H04W 24/04* (2013.01); *H04W 74/0833* (2013.01);
(Continued)

(58) Field of Classification Search
CPC . H04W 24/10; H04W 24/04; H04W 74/0833; H04W 76/18; H04W 76/27;
(Continued)

(56) References Cited

U.S. PATENT DOCUMENTS 8,615,241　B2　　12/2013　Gupta et al.
10,292,018　B2　　5/2019　Jung et al.
(Continued)

FOREIGN PATENT DOCUMENTS

CN　　102281572　A　　12/2011
CN　　102823295　A　　12/2012
(Continued)

OTHER PUBLICATIONS

European Extended Search Report for EP Application No. EP18930195. 5, dated Oct. 14, 2021, 13 pages.
(Continued)

*Primary Examiner* — Noel R Beharry
*Assistant Examiner* — Angelie T Ngo
(74) *Attorney, Agent, or Firm* — Perkins Coie LLP

(57)　　　　　　ABSTRACT

A method for wireless communication includes receiving, from a network device, an indication to perform a network maintenance strategy to generate measurement records, the indication including at least one of a type of the terminal or a measurement type, and transmitting, to the network device and based on a trigger, a maintenance message comprising the measurement records associated with at least one of a mobility of the terminal, a random access channel performance or a radio link failure; and receiving, from the network device, network maintenance measurement report information that is based on the maintenance message.

12 Claims, 12 Drawing Sheets

(51) Int. Cl.

| | | |
|---|---|---|
| *H04W 74/0833* | (2024.01) | |
| *H04W 76/18* | (2018.01) | |
| *H04W 76/27* | (2018.01) | |
| *H04W 76/30* | (2018.01) | |

(52) U.S. Cl.
CPC ........... *H04W 76/18* (2018.02); *H04W 76/27* (2018.02); *H04W 76/30* (2018.02)

(58) Field of Classification Search
CPC ..... H04W 76/30; H04W 24/08; H04W 76/10; Y02D 30/70
See application file for complete search history.

(56) References Cited

U.S. PATENT DOCUMENTS

| | | | |
|---|---|---|---|
| 2012/0190364 A1* | 7/2012 | Wu ........................ | H04W 24/10 455/436 |
| 2013/0242898 A1 | 9/2013 | Johansson et al. | |
| 2014/0187235 A1* | 7/2014 | Cai ........................ | H04W 24/10 455/422.1 |
| 2014/0317456 A1* | 10/2014 | Kim ...................... | H04W 24/10 714/48 |
| 2015/0223258 A1 | 8/2015 | Jung et al. | |
| 2015/0282107 A1 | 10/2015 | Vrind et al. | |
| 2017/0295054 A1 | 10/2017 | Lee et al. | |
| 2018/0213454 A1* | 7/2018 | Santhanam ....... | H04W 36/0085 |
| 2019/0124572 A1* | 4/2019 | Park ...................... | H04W 80/10 |
| 2019/0387409 A1* | 12/2019 | Thangarasa ........... | H04W 16/00 |
| 2020/0053795 A1* | 2/2020 | Lin ........................ | H04L 1/1812 |
| 2020/0059390 A1* | 2/2020 | Zhang .................... | H04L 1/0007 |
| 2021/0045039 A1* | 2/2021 | Lee ....................... | H04W 48/06 |
| 2021/0045162 A1* | 2/2021 | Höglund ................. | H04L 47/36 |
| 2021/0195458 A1* | 6/2021 | Priyanto .............. | H04W 24/10 |
| 2021/0282191 A1* | 9/2021 | Chang ................... | H04W 16/18 |
| 2021/0306892 A1* | 9/2021 | Li .......................... | H04W 24/10 |
| 2021/0314805 A1* | 10/2021 | Sanda .............. | H04W 28/0236 |
| 2022/0256587 A1* | 8/2022 | Fujishiro ........... | H04W 74/0833 |
| 2023/0199617 A1* | 6/2023 | Höglund .............. | H04W 72/23 370/329 |

FOREIGN PATENT DOCUMENTS

| | | | | |
|---|---|---|---|---|
| CN | 102860062 A | * | 1/2013 | ............ H04W 24/10 |
| CN | 104581777 A | | 4/2015 | |
| CN | 106416352 A | | 2/2017 | |
| KR | 2013-0081674 | | 7/2013 | |
| KR | 2014/0317456 A1 | | 10/2014 | |
| KR | 2017-0132687 | | 12/2017 | |
| KR | 20180011450 | | 2/2018 | |
| WO | 2013/187739 | | 12/2013 | |
| WO | 2014126421 A1 | | 8/2014 | |
| WO | 2017/204539 A1 | | 11/2017 | |

OTHER PUBLICATIONS

Huawei, "Introduction of NB-IoT," 3GPP TSG-RAN WG2 Meeting #94 Nanjing, P.R.China, May 23-27, 2016, R2-164287, 67 pages.
Article 94 Communication for Co-Pending European Application No. 18930195.5, dated May 19, 2023, 6 pages.
Office Action for Co-Pending Canadian Application No. 3114420, dated Jul. 20, 2023, 4 pages.
Notice of Allowance for Co-Pending KR Application No. 10-2021-7012468, dated May 23, 2023 12 pages with machine translation.
First Examination Report for Co-Pending Indian Application No. 202147016651, dated Oct. 3, 2022, 5 pages.
Office Action for Co-Pending Chinese Application No. 2018800981615, dated Jun. 6, 2022, 11 pages with unofficial translation.
International Search Report and Written Opinion in International Application No. PCT/CN2018/108055, mailed Jun. 27, 2019, 6 pages.
Office Action for Co-Pending Korean Application No. 10-2021-7012468, dated Oct. 31, 2022, 7 pages with unofficial translation.
3GPP, "3rd Generation Partnership Project; Technical Specification Group Radio Access Network; Evolved Universal Terrestrial Radio Access (E-UTRA); Radio Resource Control (RRC); Protocol specification (Release 15)," 3GPP TS 36.331 V15.3.0, Sep. 2018, 918 pages.
Office Action for Co-Pending KR Application No. 10-2023-7028344, dated Apr. 2, 2024 4 pages with unofficial English translation.
Notice of Allowance for Co-Pending CA Application No. 3114420, dated Feb. 12, 2024 1 page.
Notice of Allowance for Co-Pending KR Application No. 10-2023-7028344, dated Jul. 5, 2024, 13 pages with unofficial English translation.
LTE "Evolved Universal Terrestrial Radio Access (E-UTRA)" (3GPP TS 36.331 version 15.3.0 Release 15), Oct. 2018, 916 pages.
CMCC "Email discussion report [100#37][NB-IoT R14] Measurement Report for NB-IoT" 3GPP TSG-RAN WG2 #101 meeting R2-1803220, Athens, Greece, Feb. 26-Mar. 2, 2018, 7 pages.
EPO, Intention to Grant for European Application No. 18930195.5, mailed on Mar. 18, 2024, 8 pages.
European Extended Search Report for EP Application No. 24180671.0, dated Dec. 2, 2024, 11 pages.
Office Action for Co-Pending Canadian Application No. 3,240,716, dated Jul. 11, 2025, 5 pages.
CNIPA, First Office Action for Chinese Application No. 2023101631664, mailed on Dec. 13, 2025, 14 pages with unofficial translation.

* cited by examiner

Figure 10:
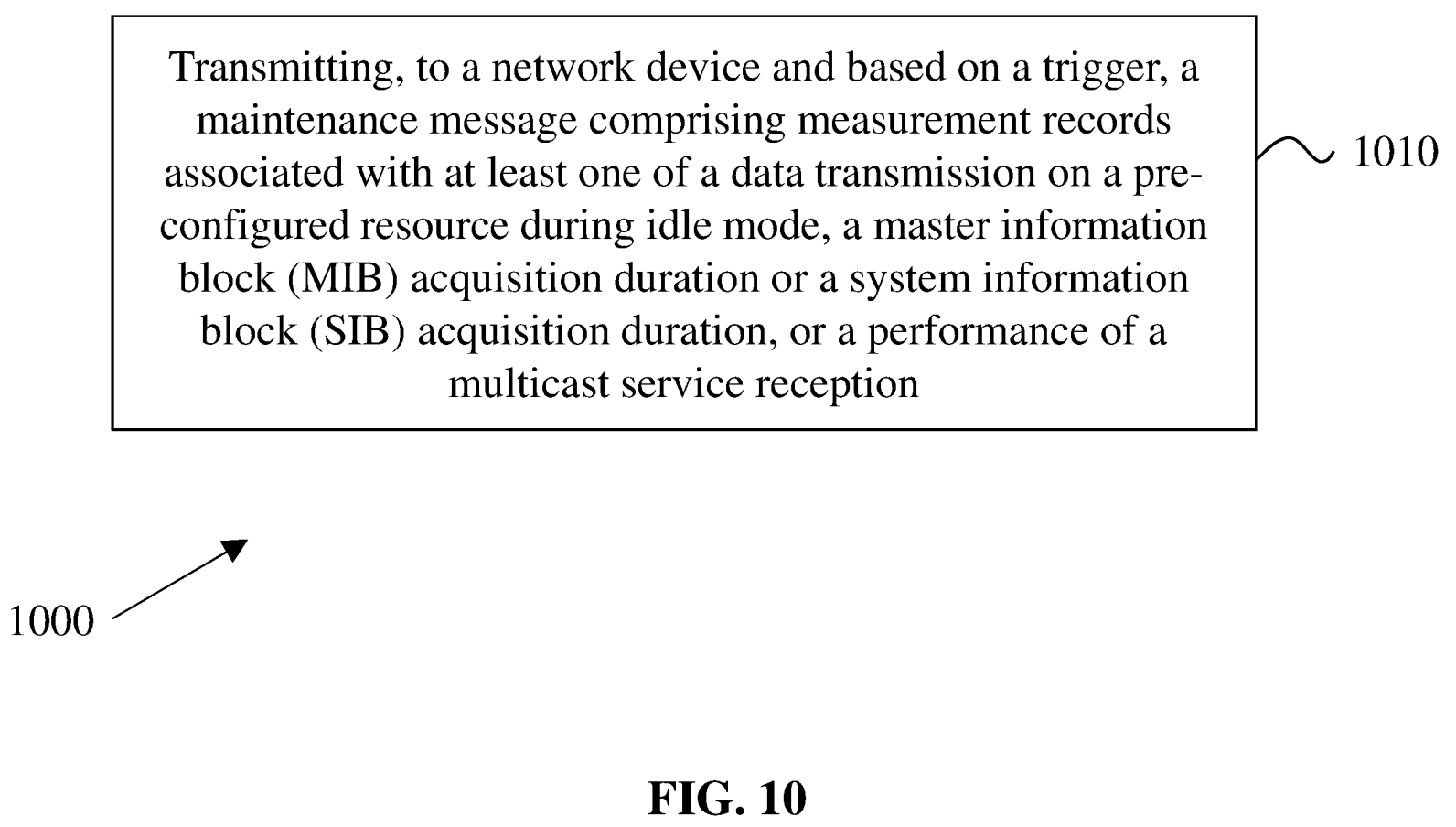

1010

Transmitting, to a network device and based on a trigger, a maintenance message comprising measurement records associated with at least one of a data transmission on a pre-configured resource during idle mode, a master information block (MIB) acquisition duration or a system information block (SIB) acquisition duration, or a performance of a multicast service reception

Receiving, from a terminal, a maintenance message comprising measurement records associated with at least one of a mobility of the terminal, a random access channel (RACH) performance or a radio link failure (RLF).

1110

1100

MEASUREMENT REPORTING FOR NETWORK MAINTENANCE METHODS AND SYSTEMS

CROSS-REFERENCE TO RELATED APPLICATIONS

This application is a continuation of International Patent Application No. PCT/CN2018/108055, filed on Sep. 27, 2018, the contents of which are incorporated herein by reference in their entirety.

TECHNICAL FIELD

This document is directed generally to wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important in meeting the needs of various communication scenarios. In comparison with the existing wireless networks, next generation systems and wireless communication techniques need to provide support for an increased number of users and devices, as well as support for higher data rates, thereby requiring user equipment to implement energy conservation techniques.

SUMMARY

This document relates to methods, systems, and devices for measurement reporting for network maintenance. In an example, this may be achieved by including a more thorough set of network information for systems with high energy saving requirements.

In one exemplary aspect, a wireless communication method is disclosed. The method includes transmitting, to a network device and based on a trigger, a maintenance message comprising measurement records associated with at least one of a data transmission on a pre-configured resource during idle mode, a master information block (MIB) acquisition duration or a system information block (SIB) acquisition duration, or a performance of a multicast service reception, where the trigger is based on a periodic reporting schedule, an occurrence of an event, or an establishment of a wireless communication with the network device.

In another exemplary aspect, a wireless communication method is disclosed. The method includes transmitting, to a network device and based on a trigger, a maintenance message comprising measurement records associated with at least one of a mobility of the terminal, a random access channel (RACH) performance or a radio link failure (RLF), where the trigger is based on a periodic reporting schedule, an occurrence of an event, or an establishment of a wireless communication with the network device.

In yet another exemplary aspect, a wireless communication method is disclosed. The method includes receiving, from a terminal, a maintenance message comprising measurement records associated with at least one of a data transmission on a pre-configured resource during idle mode, a master information block (MIB) acquisition duration or a system information block (SIB) acquisition duration, or a performance of a multicast service reception.

In yet another exemplary aspect, a wireless communication method is disclosed. The method includes receiving, from a terminal, a maintenance message comprising measurement records associated with at least one of a mobility of the terminal, a random access channel (RACH) performance or a radio link failure (RLF).

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

BRIEF DESCRIPTION OF THE DRAWINGS

FIG. 10 shows an example of a wireless communication method, in accordance with some embodiments of the presently disclosed technology.

DETAILED DESCRIPTION

Figure 1:
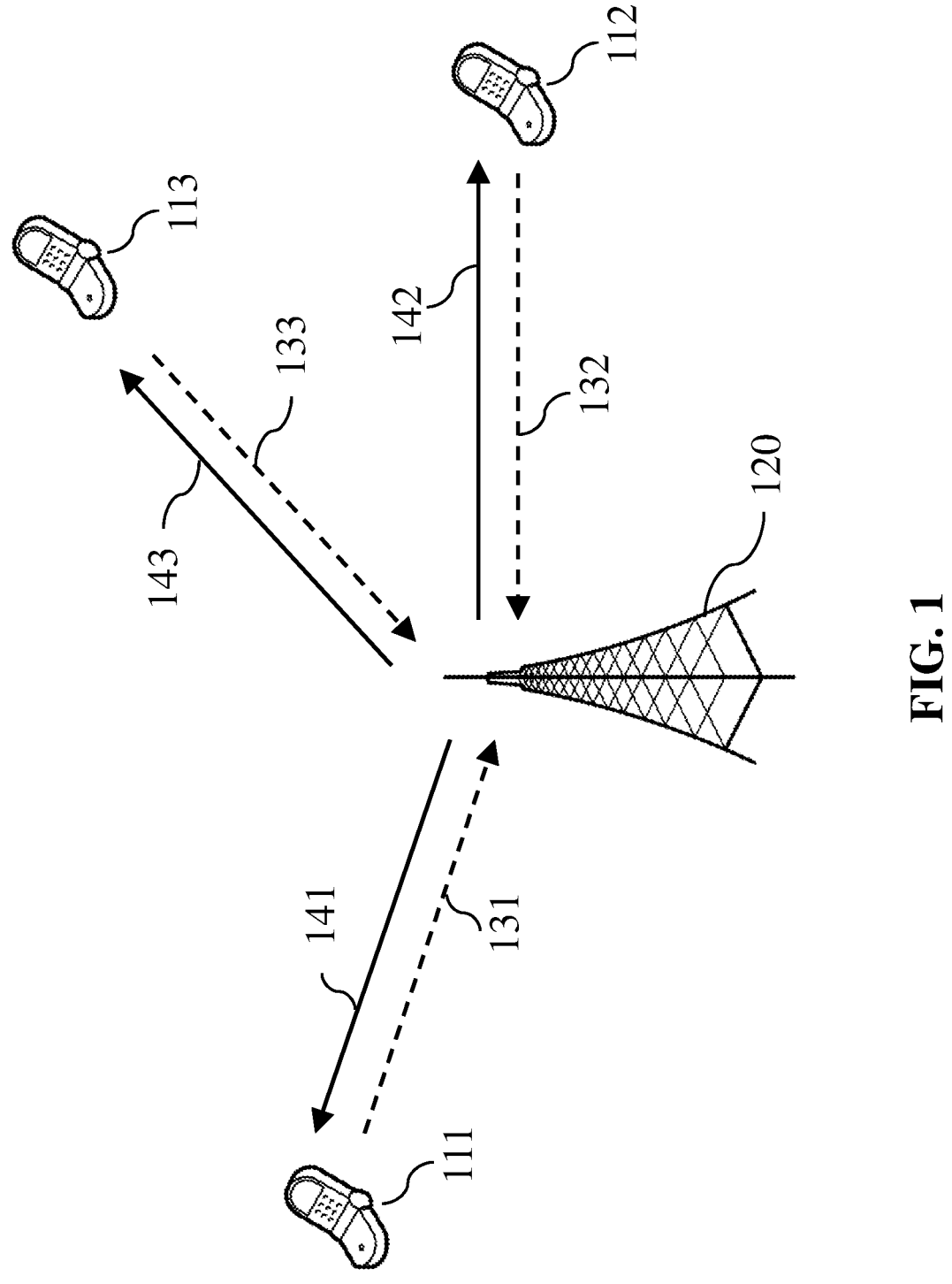
FIG. 1 shows an example of a base station (BS) and user equipment (UE) in wireless communication, in accordance with some embodiments of the presently disclosed technology.

For recent and future Narrowband Internet-of-Things (NB-IoT) implementations and systems, which mainly carry short data packets and/or transmissions, UE energy savings are crucial. In order to reduce the power consumption overhead of the UE, and considering that NB-IoT terminals spend relatively short periods of time in the RRC connection mode, an NB-IoT terminal does not support an inter-cell handover in the connection mode and the related measurement reporting, and thus, the evolved Node-B (eNB) cannot acquire the UE's radio coverage.

To fulfill network maintenance requirements, the eNB typically needs to obtain radio coverage of the cell in which the UE is located. For example, the NB-IoT standard can report the Reference Signal Received Power (RSRP) and the Reference Signal Received Quality (RSRQ) information of the cell where the UE is located in the RRC using, for example, Msg5 that may include RRCConnectionSetupComplete, RRCConnectionResumeComplete, or RRCConnectionReestablishmentComplete. However, this information may be insufficient in certain scenarios or implementations.

For example, if the radio quality of the location of the UE is poor, the RRC connection establishment may fail, and the radio quality cannot be reported. In addition, for the EDT (Early Data Transmission) process without Msg5, the radio quality cannot be reported. In addition, the eNB may not be able to determine the abnormal behavior flow of the UE in the idle mode (for example, the cell reselection abnormality in the idle mode, the failure of the PRACH process, etc.), and the related information may be required for network maintenance.

In some embodiments, the "Logged Measurement" process is supported in the Evolved Universal Terrestrial Radio Access Network (E-UTRAN) standard, wherein an eNB configures UE idle state behavior by sending measurement configuration information to the UE using dedicated RRC signaling (LoggedMeasurementConfiguration). In an example, the measurement configuration information includes measurement time, measurement area, measurement duration, measurement interval, and the like. The UE records the UE measurement result based on the measurement configuration information and reports it according to the eNB requirement. In addition, the E-UTRAN standard also supports UE mobility process related records, RACH performance related records, RLF related records, measurement log records, and connection establishment failure records.

In some embodiments, the UE carries an availability indication for the UE behavior information record (e.g., rlf-InfoAvailable, log MeasAvailable, connEstFailInfoAvailable, mobilityHistoryAvail) in the Msg5 (RRCConnectionSetupComplete, RRCConnectionResumeComplete, RRCConnectionReestablishmentComplete) and RRC Reconfiguration Complete (RRCConnectionReconfigurationComplete) messages. The eNB requests the UE to report the UE behavior information record (rach-ReportReq, rlf-ReportReq, log MeasReportReq, connEstFailReportReq, mobilityHistoryReportReq) through RRC dedicated signaling (UEInformationRequest). The UE reports the UE behavior information record (rach-Report, rlf-Report, LogMcasReport, ConnEstFailReport, MobilityHistoryReport) through RRC dedicated signaling (UEInformationResponse) based on the request of the eNB. The rach-Report, rlf-Report, and ConnEstFailReport only record the last record. If the UE does not successfully initiate a service connection after the abnormality, the related record cannot be reported.

In some embodiments, Log MeasReport involves a large number of measurement records (such as neighbor measurement results information, UE location information), and the storage and reporting of such information may not be suitable for low-cost and low-power NB-IoT terminals. In addition, the measurement configuration, the measurement report request, and the measurement record report are all carried by the dedicated RRC information, which typically cannot meet the requirement for the NB-IoT terminals with their high energy-saving requirements. Furthermore, the E-UTRAN rach-Report does not involve information such as the wireless coverage of the UE in the NB-IoT. No information related to the failure of service transmission based on pre-configured dedicated resources introduced for energy saving.

Thus, embodiments of the disclosed technology advantageously provide a more comprehensive set of information (e.g., measurement records and results) that enable the UE in NB-IoT systems to report their idle mode behaviors in an energy-efficient manner.

FIG. 1 shows an example of a wireless communication system (e.g., an LTE, 5G or New Radio (NR) cellular network) that includes a BS 120 and one or more user equipment (UE) 111, 112 and 113. In some embodiments, the BS may transmit an indication to perform a network maintenance strategy to generate the measurement records (141, 142, 143) to the UEs, which may then responds with maintenance messages (131, 132, 133) that include the relevant measurement records and results. The UE may be, for example, a smartphone, a tablet, a mobile computer, a machine to machine (M2M) device, a terminal, a mobile device, an Internet of Things (IoT) device, and so on.

The present document uses section headings and subheadings for facilitating easy understanding and not for limiting the scope of the disclosed techniques and embodiments to certain sections. Accordingly, embodiments disclosed in different sections can be used with each other. Furthermore, the present document uses examples from the 3GPP New Radio (NR) network architecture and 5G protocol only to facilitate understanding and the disclosed techniques and embodiments may be practiced in other wireless systems that use different communication protocols than the 3GPP protocols.

Examples of Measurement Reporting for Network Maintenance

As previously discussed, the current Log MeasReport involves a large number of measurement records (such as neighbor measurement results information, UE location information), and the storage and reporting of such information is not suitable for low-cost and low-power NB-IoT terminals. In some embodiments, NB-IoT does not support connection mode mobility, so only key events related to idle mode UE mobility (cell reselection) should be reported to the eNB in order to converse energy.

In some embodiments, and for the RACH performance report, since the NB-IoT supports multiple coverage enhancement levels (CELs), accumulating the number of preamble transmissions of the UE for multiple PRACH processes may not be feasible. Therefore, the UE needs to report related information of each PRACH process, which may include the initial radio coverage enhancement level of the random access procedure or information such as the cell RSRP that characterizes the radio quality of the cell, the initial UE transmit power of the random access procedure, the cell ID of the random access, the time of the random access procedure, the neighbor area radio quality measurement result, a reason for random access procedure failure (e.g., the initial attempt failed, no resources available, a maximum number of attempts reached), whether the Msg2 PDCCH is not resolved, whether the Msg2 is not decoded (e.g., since the coverage level is not suitable), or the Msg4 conflict resolution fails.

In some embodiments, and in the Radio Link Failure (RLF) report, the NB-IoT system supports the unique EarlyRLF function (e.g., early-in-sync or early-out-of-sync), and the UE needs to report related information to the CNB.

In some embodiments, data transmission based on a pre-configured resource when the UE is in an idle mode may be supported in NB-IoT. If the related function fails, the eNB is not aware of the information, so the UE needs to report related information to the eNB to facilitate network parameter optimization.

In some embodiments, the master information block (MIB) and/or the system information block (SIB) acquisition duration can be used by the eNB to determine whether the current MIB/SIB related parameters are appropriate, but there is no precedent for reporting related information.

In some embodiments, the multicast service receiving performance-related measurement record can be used to determine the scheduling performance of the multicast service, and can also be used as an accurate feedback for the reception of the multicast service. However, there is no precedent for reporting related information.

Figure 2:
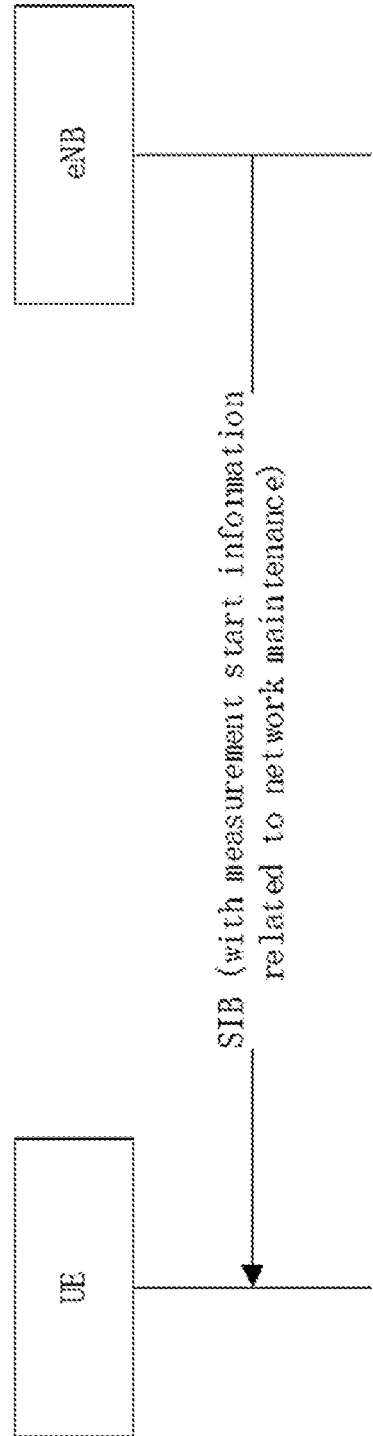
FIG. 2 shows an example of configuring the maintenance message startup strategy for the UE through a system information block (SIB).

FIG. 2 shows an example of configuring the maintenance message startup strategy for the UE through an SIB. As shown therein, the base station configures network maintenance related measurement configuration information for the UE through the SIB. All UEs in the cell receive the same SIB, but the network maintenance related measurement is not suitable for all types of UEs. For example, the static UE does not have mobility, and would not provide the "UE mobility related measurement reporting" result. In addition, different network maintenance requirements require the UE to provide different measurement results. Therefore, the measurement initiation strategy of the SIB broadcast needs to include the UE category and/or measurement type. In order to meet different measurement reporting requirements, the measurement configuration information may include a measurement reporting method.

In some embodiments, the UE type may include at least one of: whether the non-stationary UE performs measurement reporting, whether a terminal that can charge or replace the battery performs measurement and reporting, or whether the low-power terminal performs measurement and reporting, etc.

In some embodiments, a type of measurement includes at least one of:

UE mobility related measurement report;

RACH Performance related measurement report;

RLF (Radio Link Failure) related measurement report;

Idle mode based on pre-configured resources for data transmission related measurement reporting;

Master information block (MIB) acquisition duration and/or a system information block (SIB) acquisition duration report; and Performance of a multicast service reception report.

In some embodiments, the measurement reporting mode (or method) may be one of:

A periodic report;

An event-based report;

A follow-up report during the establishment of service; and

A follow-up indication during the establishment of service of whether the measurement record exists in the UE. For example, the eNB may determine whether the record needs to be reported based on the indication.

In some embodiments, if the measurement reporting method (or mode) is periodic, the measurement configuration information needs to include the reporting period or reporting interval.

Figure 3:
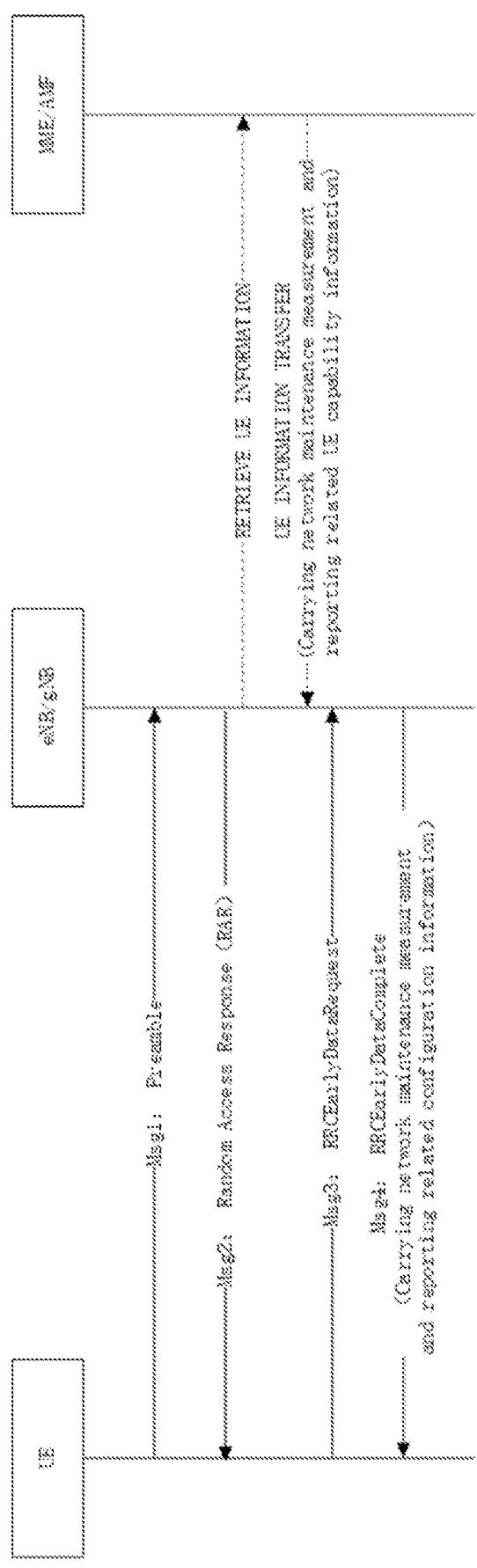
FIG. 3 shows an example of configuring the maintenance message for the UE based on Msg4 Radio Resource Control (RRC) signaling.

FIG. 3 shows an example of configuring the maintenance message for the UE based on Msg4 Radio Resource Control (RRC) signaling. As shown therein, the eNB acquires the UE information from the MME after Msg3; if the UE information indicates that the UE supports the network maintenance measurement report, the eNB configures the network maintenance measurement report information and transmits it to the UE in Msg4. In order to meet different measurement reporting requirements, the measurement configuration information may include a measurement reporting method.

In some embodiments, the UE supports network maintenance measurement reporting, including at least one of the following:

UE mobility related measurement reporting;

RACH Performance related measurement reporting;

RLF (Radio Link Failure) related measurement reporting;

Idle mode data transmission related measurement reporting based on pre-configured resources;

Master information block (MIB) acquisition duration and/or a system information block (SIB) acquisition duration reporting; and Performance of a multicast service reception reporting.

In some embodiments, the configuration of the network maintenance measurement report related information transmitted to the UE includes at least one of the following:

Instructing the UE to record mobility related measurement report information;

Instructing the UE to record the RACH Performance related measurement report information;

Instructing the UE to record the RLF (Radio Link Failure) related measurement report information;

Instructing the UE to record the idle mode data transmission related measurement report information that is based on the pre-configured resource; and Instructing the UE to record measurement report information related to MIB and/or SIB acquisition duration.

Instructing the UE to record measurement report information related to performance of a multicast service reception.

In some embodiments, Msg3 includes at least one of the following: RRCConnectionRequest, RRCConnectionResumeRequest, and RRCEarlyDataRequest.

In some embodiments, Msg4 includes at least one of the following: RRCConnectionSetup, RRCConnectionResume, RRCConnectionReestablishment, RRCConnectionReconfiguration, RRCConnectionReject, RRCConnectionRelease, and RRCEarlyDataComplete.

In some embodiments, the measurement reporting method includes at least one of the following:

A periodic report;

An event-based report;

A follow-up report during the establishment of service; and

A follow-up indication during the establishment of service of whether the measurement record exists in the UE. For example, the eNB may determine whether the record needs to be reported based on the indication.

In some embodiments, if the measurement reporting mode is periodic, the measurement configuration information needs to include the reporting period or reporting interval.

Figure 4:
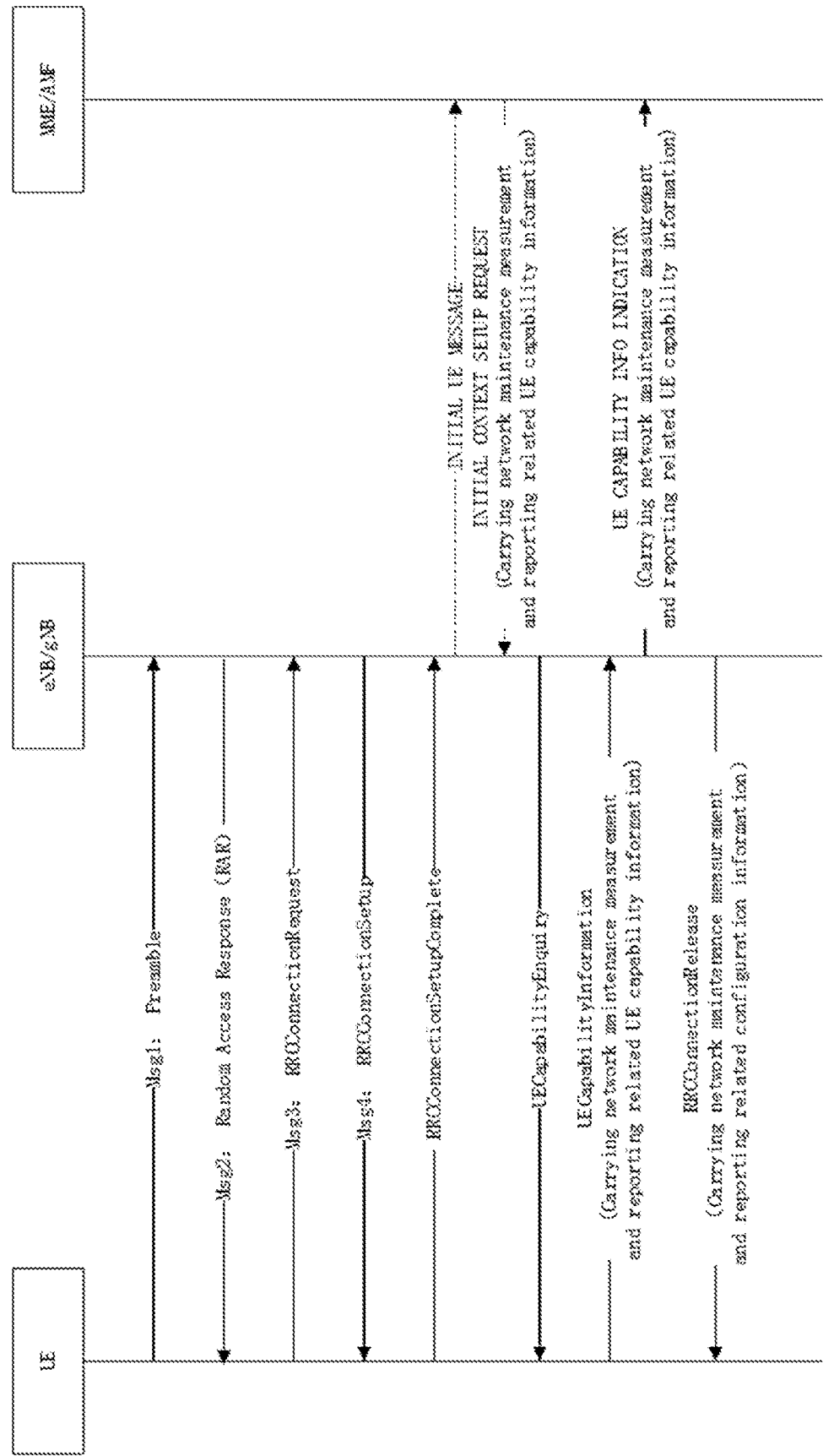
FIG. 4 shows an example of maintenance message and UE reporting initiation policies based on RRC signaling.

FIG. 4 shows an example of maintenance message and UE reporting initiation policies based on RRC signaling. As shown therein, the eNB obtains network maintenance measurement report related UE capability information from the INITIAL CONTEXT SETUP REQUEST sent by the MME after Msg5. If the network maintenance measurement report related UE capability information is not carried in the INITIAL CONTEXT SETUP REQUEST, the eNB sends a UECapabilityEnquiry to the UE. The UE then sends a UECapabilityInformation response to the eNB, where the network maintenance measurement reports the relevant UE capability information. The eNB then sends the UE CAPABILITY INFO INDICATION to the MME, where the network maintenance measurement reports relevant UE capability information, which is used by the eNB to acquire the UE related capability information from the MME.

In some embodiments, the eNB configures network maintenance measurement reporting related configuration information for the UE in the downlink RRC message after Msg5.

In some embodiments, the UE supports network maintenance measurement reporting, including at least one of the following:

UE mobility related measurement reporting;

RACH Performance related measurement reporting;

RLF (Radio Link Failure) related measurement reporting;

Idle mode data transmission related measurement reporting based on pre-configured resources;

Master information block (MIB) acquisition duration and/or a system information block (SIB) acquisition duration reporting; and Performance of a multicast service reception reporting.

In some embodiments, the configuring of the network maintenance measurement report related information transmitted to the UE includes at least one of the following:

Instructing the UE to record mobility related measurement report information;

Instructing the UE to record the RACH Performance related measurement report information;

Instructing the UE to record the RLF (Radio Link Failure) related measurement report information;

Instructing the UE to record the idle mode data transmission related measurement report information based on the pre-configured resource;

Instructing the UE to record measurement report related to MIB and/or SIB acquisition duration; and Instructing the UE to record measurement report information related to performance of a multicast service reception.

In some embodiments, Msg5 includes at least one of the following: RRCConnectionSetupComplete, RRCConnectionResumeComplete, and RRCConnectionReestablishmentComplete.

In some embodiments, the RRC downlink message after Msg5 includes at least one of the following: RRCConnectionReconfigurationComplete and RRCConnectionRelease.

Figure 5:
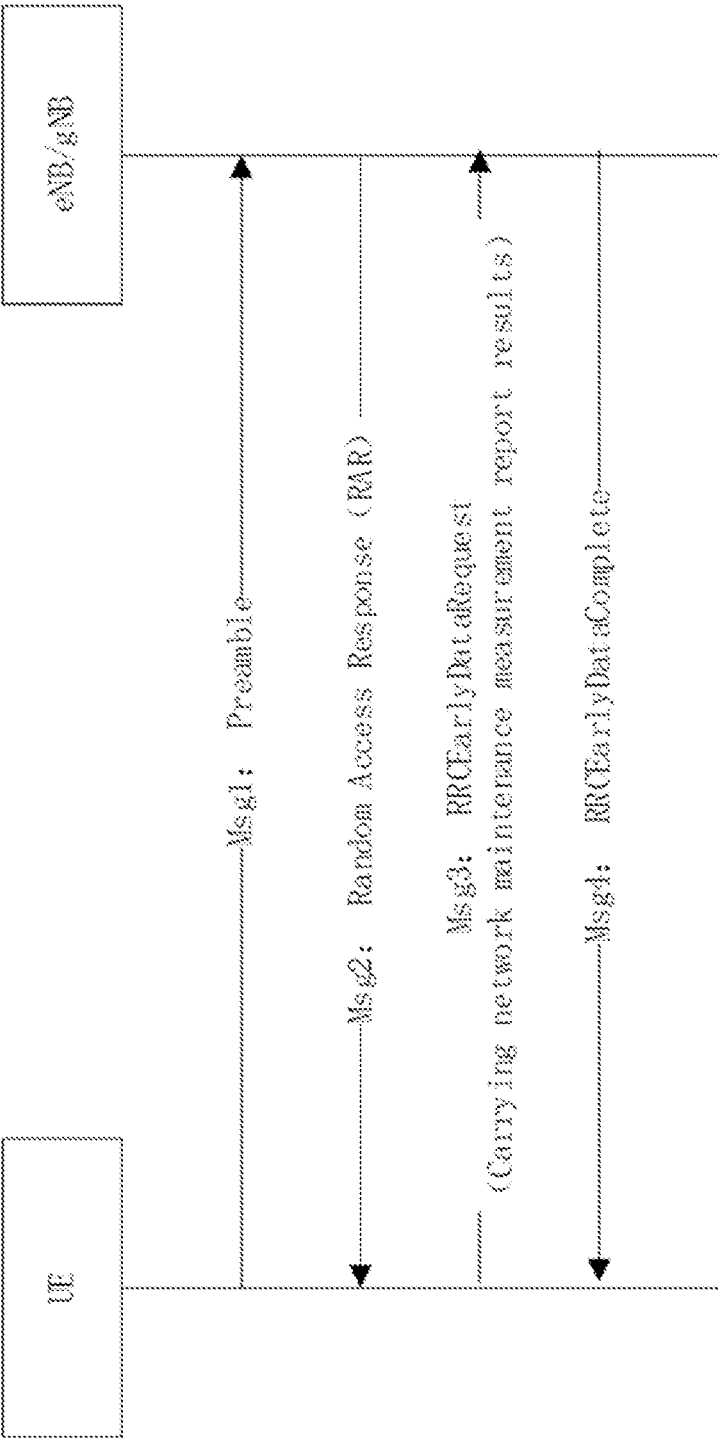
FIG. 5 shows an example of an Early Data Transmission (EDT) process reporting the maintenance measurement results.

FIG. 5 shows an example of an Early Data Transmission (EDT) process reporting the maintenance measurement results. As shown therein, the UE has network measurement related measurement results, and the amount of measurement result data and other pending information from the UE can be transmitted through Msg3. (For example: the amount of measurement data+the total amount of other information to be transmitted is less than or equal to 1000 bits). In some embodiments, the UE carries the network maintenance measurement report result in Msg3.

In some embodiments, Msg3 includes at least one of the following: RRCConnectionRequest, RRCConnectionResumeRequest and RRCEarlyDataRequest.

In some embodiments, if Msg3 carries the network maintenance measurement report result, the measurement report result related information element can be directly carried by Msg3, or the related information can be carried by the MAC CE or MAC PDU accompanying Msg3.

In some embodiments, the network maintenance measurement report result includes at least one of the following:

UE mobility related measurement report information;

RACH Performance related measurement report information;

RLF (Radio Link Failure) related measurement report information;

Idle mode based on pre-configured resource data transmission related measurement report information;

Master information block (MIB) acquisition duration and/or a system information block (SIB) acquisition duration report information; and Performance of a multicast service reception report information.

The measurement report information for the exemplary cases enumerated above may be further detailed as:

In some embodiments, UE mobility related measurement record report information includes one or more mobility related records, including at least one of the following: cell reselection process information and cell resident information.

In some embodiments, cell reselection process information includes at least one of the following: cell information (source cell information) before cell reselection, cell information (target cell information) after cell reselection, and cell reselection time.

In some embodiments, cell camping information includes at least one of the following: resident cell information and duration of stay in the cell.

In some embodiments, the cell information includes at least one of the following: cell global identity (CGI) or Physical Cell Identity (PCI), cell-specific frequency (anchor carrier frequency), cell radio quality (RSRP, RSRQ or CEL), and whether the PRACH/RRC process failure has occurred before cell reselection.

RACH Performance related measurement record reporting information includes one or more RACH Performance related records. The RACH Performance related record includes at least one of the following pieces of information: the initial radio coverage enhancement level of the random access procedure or the information that characterizes the radio quality of the cell (such as the cell RSRP), the initial UE transmit power of the random access procedure; the cell ID of the random access, the time of the random access procedure transmission, the total number of preamble transmissions, the neighboring radio quality measurement results (e.g., list), the reason for random access procedure failure (e.g., initial attempt failed, no resources available, or maximum number of attempts), Msg2 PDCCH or Msg2 not being decoded or received correctly solved (e.g., the coverage level is not suitable), the Msg4 conflict resolution fails, and whether the resource conflict is detected.

The RLF related measurement record report information includes at least one of the following pieces of information: the Source cell ID at RLF, the RLF occurrence time, the RSRP of the source cell when RLF occurs and whether RRC connection re-establishment is triggered when RLF occurs, the target cell ID when the RLF is re-established, the RSRP of the target cell when the RLF is re-established, the length of time during which the RLF does not detect the synchronization information, the number of dedicated PDCCH repetitions when the RLF occurs, whether it is EarlyRLF or Legacy RLF, and the type of RLF occurrence.

The idle mode is based on the data transmission related measurement record reporting information of the pre-configured resource, including one or more records. A record includes at least one of the following pieces of information: the fact that the idle mode is based on the cell information of the data transmission of the pre-configured resource, the reason for the data transmission failure, the data transmission failure indication, the number of attempts of data transmission, the number of data transmission repetitions, and the resource type used for data transmission.

In some embodiments, the cell information includes at least one of the following: Cell Global Identity (CGI) or Physical Cell Identity (PCI), cell-specific frequency (anchor carrier frequency), and cell quality (RSRP, RSRQ or CEL).

In some embodiments, the MIB and/or the SIB acquisition duration related measurement record reporting information includes one or more records. Each of these records includes at least one of the following: the UE camping cell identifier, the duration of the MIB and/or the SIB, and the time at which the UE acquired the MIB and/or SIB.

In some embodiments, the multicast service receiving performance related measurement record includes one or more records, each of which may include at least one of the following: the multicast service receiving and receiving time, the number of successful packets received by the multicast service, the receiving time of the multicast service, and the receiving control. In some embodiments, the channel does not detect the indication of the traffic channel, receives the number of packets of the control channel, and receives the number of packets of the traffic channel.

Figure 6:
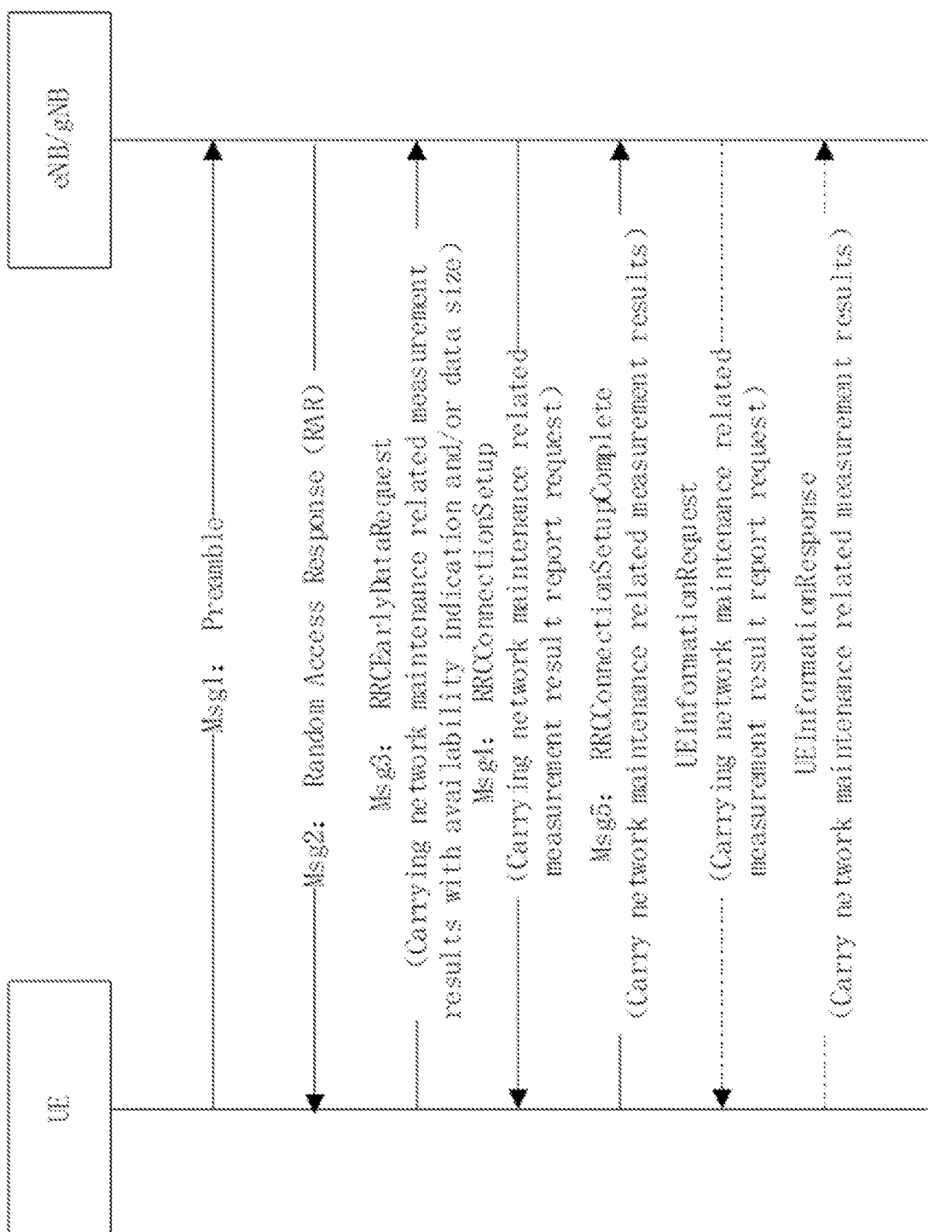
FIG. 6 shows another example of the EDT process (for a 5G system) reporting the presence of maintenance measurement results.

FIG. 6 shows another example of the EDT process reporting the presence of maintenance measurement results. As shown therein, the UE has network maintenance related measurement results, and there are network maintenance measurement report results indications and/or a data volume size in Msg3.

In some embodiments, the eNB requests the measurement result related to the network maintenance in Msg4, and the UE carries the network maintenance related measurement result in Msg5. Alternatively, the eNB sends a UEInformationRequest after Msg5, wherein the network maintenance related measurement result reporting request is carried, and the UE sends a UEInformationResponse to the eNB, wherein the network maintenance related measurement result is carried.

In some embodiments, Msg3 includes at least one of the following: RRCConnectionRequest, RRCConnectionResumeRequest, and RRCEarlyDataRequest.

In some embodiments, Msg4 includes at least one of the following: RRCConnectionSetup, RRCConnectionResume, RRCConnectionReestablishment, and RRCConnectionReconfiguration.

In some embodiments, Msg5 includes at least one of the following: RRCConnectionSetupComplete, RRCConnectionResumeComplete, RRCConnectionReestablishmentComplete and RRCConnectionReconfigurationComplete.

In some embodiments, if Msg5 carries the network maintenance measurement report result, the measurement result related information element can be directly carried by Msg5.

In some embodiments, the network maintenance related measurement result report request includes at least one of the following:

Report of all measurement records;
Report of UE mobility related measurement records;
Report of RACH Performance related measurement records;

Report of related measurement records related to RLF (Radio Link Failure);
Report of idle mode based on pre-configured resource data transmission related measurement records;
Report of Master Information Block (MIB) acquisition duration and/or a System Information Block (SIB) acquisition duration reporting; and
Report of performance of a multicast service reception reporting.

In some embodiments, the network maintenance measurement result report includes at least one of the following:
UE mobility related measurement report information;
RACH Performance related measurement report information;
RLF (Radio Link Failure) related measurement report information; and
Idle mode data transmission related measurement report information based on pre-configured resource.
Master Information Block (MIB) acquisition duration and/or a System Information Block (SIB) acquisition duration report information.
Performance of a multicast service reception report information.

The measurement report information for the exemplary cases enumerated above may be further detailed as:
In some embodiments, UE mobility related measurement record report information includes one or more mobility related records, including at least one of the following: cell reselection process information and cell resident information.

In some embodiments, cell reselection process information includes at least one of the following: cell information (source cell information) before cell reselection, cell information (target cell information) after cell reselection, and cell reselection time.

In some embodiments, cell camping information includes at least one of the following: resident cell information and duration of stay in the cell.

In some embodiments, the cell information includes at least one of the following: cell global identity (CGI) or Physical Cell Identity (PCI), cell-specific frequency (anchor carrier frequency), cell radio quality (RSRP, RSRQ or CEL), and whether the PRACH/RRC process failure has occurred before cell reselection.

RACH Performance related measurement record reporting information includes one or more RACH Performance related records. The RACH Performance related record includes at least one of the following pieces of information: the initial radio coverage enhancement level of the random access procedure or the information that characterizes the radio quality of the cell (such as the cell RSRP), the initial UE transmit power of the random access procedure; the cell ID of the random access, the time of the random access procedure transmission, the total number of preamble transmissions, the neighboring radio quality measurement results (e.g., list), the reason for random access procedure failure (e.g., initial attempt failed, no resources available, or maximum number of attempts), Msg2 PDCCH or Msg2 not being decoded or received correctly solved (e.g., the coverage level is not suitable), the Msg4 conflict resolution fails, and whether the resource conflict is detected.

The RLF related measurement record report information includes at least one of the following pieces of information: the Source cell ID at RLF, the RLF occurrence time, the RSRP of the source cell when RLF occurs and whether RRC connection re-establishment is triggered when RLF occurs, the target cell ID when the RLF is re-established, the RSRP of the target cell when the RLF is re-established, the length of time during which the RLF does not detect the synchronization information, the number of dedicated PDCCH repetitions when the RLF occurs, whether it is EarlyRLF or Legacy RLF, and the type of RLF occurrence.

The idle mode is based on the data transmission related measurement record reporting information of the pre-configured resource, including one or more records. A record includes at least one of the following pieces of information: the fact that the idle mode is based on the cell information of the data transmission of the pre-configured resource, the reason for the data transmission failure, the data transmission failure indication, the number of attempts of data transmission, the number of data transmission repetitions, and the resource type used for data transmission.

In some embodiments, the cell information includes at least one of the following: Cell Global Identity (CGI) or Physical Cell Identity (PCI), cell-specific frequency (anchor carrier frequency), and cell quality (RSRP, RSRQ or CEL).

In some embodiments, the MIB and/or the SIB acquisition duration related measurement record reporting information includes one or more records. Each of these records includes at least one of the following: the UE camping cell identifier, the duration of the MIB and/or the SIB, and the time at which the UE acquired the MIB and/or SIB.

In some embodiments, the multicast service receiving performance related measurement record includes one or more records, each of which may include at least one of the following: the multicast service receiving and receiving time, the number of successful packets received by the multicast service, the receiving time of the multicast service, and the receiving control. In some embodiments, the channel does not detect the indication of the traffic channel, receives the number of packets of the control channel, and receives the number of packets of the traffic channel.

Figure 7:
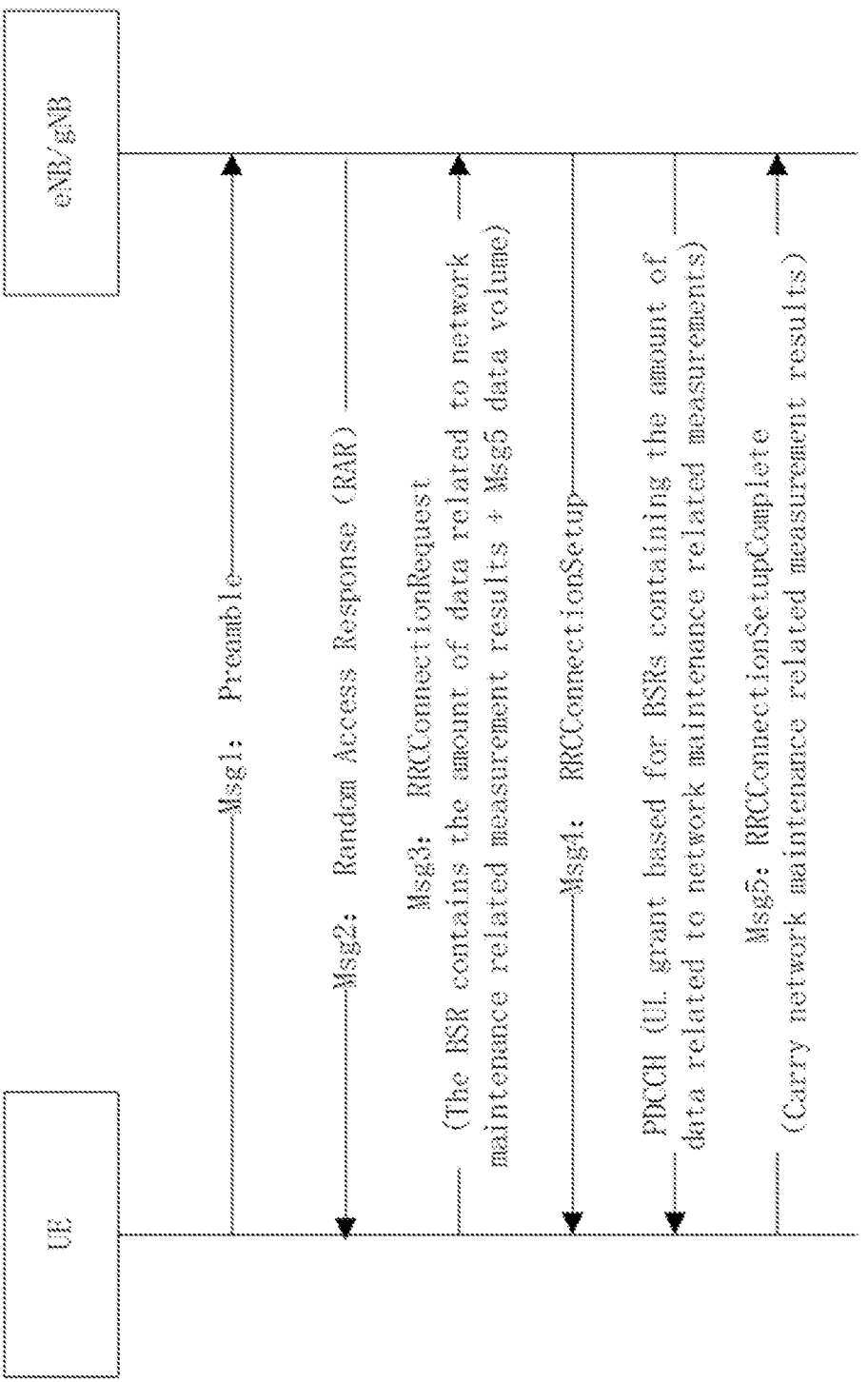
FIG. 7 shows an example of a non-EDT process reporting the maintenance measurement results.

FIG. 7 shows an example of a non-EDT process reporting the maintenance measurement results. As shown therein, the amount of data volume of the network maintenance related measurement result and Msg5 is included in the BSR information reported by the UE in Msg3 or BSR subsequently reported. In some embodiments, the eNB performs an uplink grant for the Msg5 transmission to the UE based on the BSR, and the UE carries the network maintenance related measurement result in the Msg5.

In some embodiments, the measurement results related to the Msg3/Msg5 and network maintenance are the same as those in FIG. 6.

Figure 8:
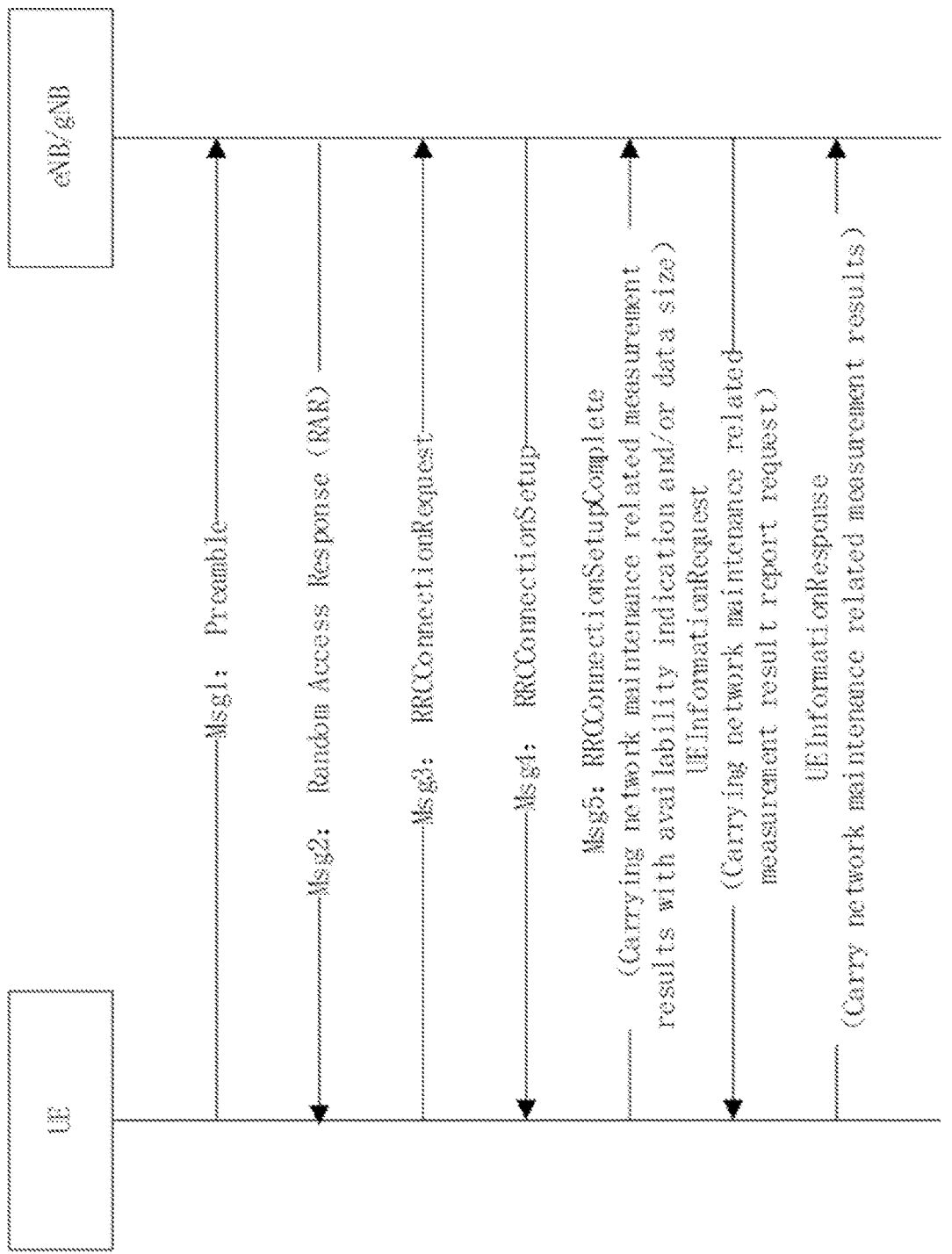
FIG. 8 shows an example of the non-EDT process reporting the presence of maintenance measurement results.

FIG. 8 shows an example of the legacy (or non-EDT) process reporting the presence of maintenance measurement results. As shown therein, the UE carries the network maintenance related measurement result presence indication and/or the data volume size in Msg5. The CNB then sends the network maintenance related measurement result reporting request to the UE after Msg5, and the UE sends the network maintenance related measurement result to the eNB based on the request.

In some embodiments, Msg5, the network maintenance related measurement result report request, and the network maintenance related measurement result are the same as the related information in FIG. 6.

After Msg5 is sent to the UE, the network maintenance related measurement result report request may be performed by using any of the following messages: UEInformationRequest, RRCConnectionReconfiguration, or a newly added RRC message.

The sending of the network maintenance related measurement result to the eNB may be performed by using any one of the following messages: UEInformationResponse, RRCConnectionReconfigurationComplete, or a newly added RRC message.

Figure 9:
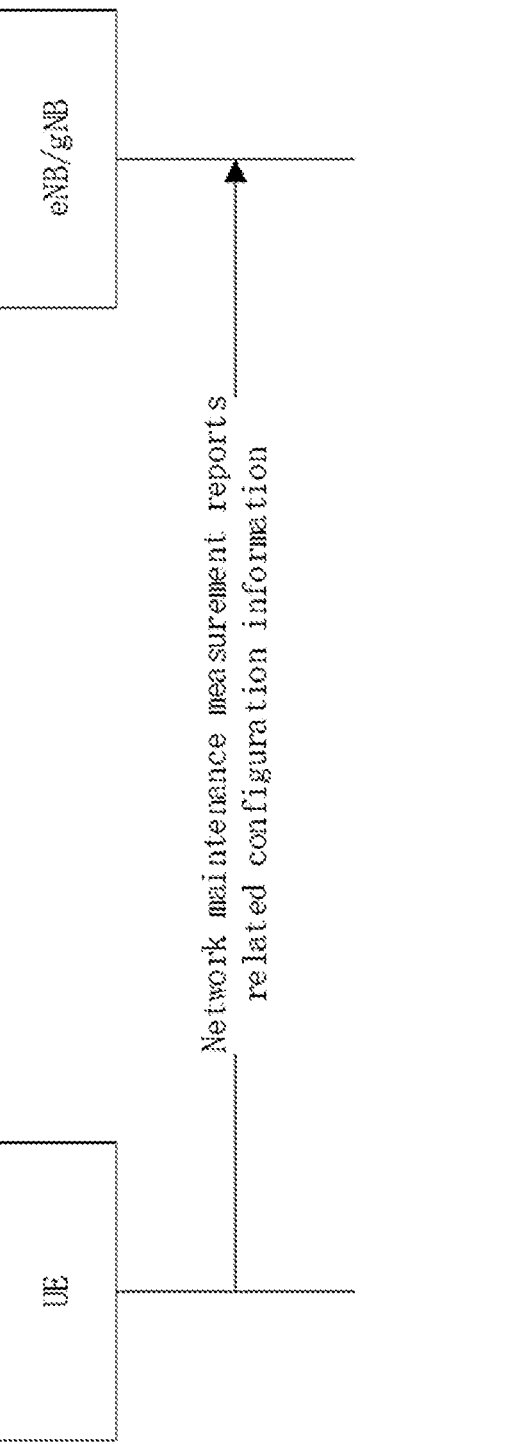
FIG. 9 shows an example a maintenance message periodic report or an event report.

FIG. 9 shows an example of a maintenance message periodic report or an event report. In this context, if the measurement reporting method included in the network maintenance related measurement configuration information in FIG. 2 or FIG. 3 is periodic reporting, and if the UE has a measurement record when the reporting period expires, the related measurement record information is reported.

In some embodiments, and if the measurement reporting method included in the network maintenance related measurement configuration information in FIG. 2 or FIG. 3 is an event triggered report, the UE actively reports the relevant measurement when generating the measurement record or measuring the maximum number of records to reach the recordable maximum number. Following this method, the eNB needs to configure the ProhibitTimer for the UE. After the UE reports a record, the timer ProhibitTimer is started, and no new measurement record is reported until the ProhibitTimer expires.

Exemplary Methods for the Disclosed Technology

Embodiments of the presently disclosed technology provide measurement reporting methods and systems for network maintenance. The examples of the disclosed technology provided below explain general concepts, and are not meant to be interpreted as limiting. In an example, unless explicitly indicated to the contrary, the various features described in these examples may be combined.

Example 1. In one example, the UE reports to the base station, the network maintenance related measurement result information, which includes at least one of:

UE mobility related measurement records;

RACH performance related measurement records;

RLF related measurement records;

Idle mode based on pre-configured resource data transmission related measurement records;

MIB and/or SIB acquisition duration related measurement records; and Multicast service receiving performance related measurement records.

In some embodiments, the measurement reporting method may be one of:

A periodic report;

An event-based report;

A follow-up report during the establishment of service; and

A follow-up indication during the establishment of service of whether the measurement record exists in the UE. For example, the eNB may determine whether the record needs to be reported based on the indication.

Example 2. In some embodiments, and in the context of Example 1, the network maintenance related measurement result information may include one or more of the following:

The UE mobility related measurement record reporting information includes one or more mobility related records, and the list includes at least one of the following: a cell reselection process information and cell resident information.

In some embodiments, cell reselection process information includes at least one of the following: cell information (source cell information) before cell reselection, cell information (target cell information) after cell reselection, and cell reselection time.

In some embodiments, cell camping information includes at least one of the following information: resident cell information, duration of stay in the cell.

In some embodiments, the cell (source or target) information includes at least one of the following: Cell Global Identity (CGI) or Physical Cell Identity (PCI), a frequency of the cell (anchor carrier frequency), cellular radio quality (RSRP, RSRQ or CEL), or whether or not PRACH/RRC process failure has occurred before cell reselection.

RACH Performance related measurement record reporting information includes one or more RACH Performance related records. In some embodiments, the RACH Performance related record includes at least one of the following information: information indicating the radio quality of the cell (e.g., the initial radio coverage enhancement level of the random access procedure, the RSRP of the cell or the initial UE transmit power of the random access procedure), the cell ID of the random access, the time when the random access process occurred, the total number of preambles transmitted, a resource type (e.g., legacy or EDT preamble, legacy preamble or Format2 preamble, etc.), a list of neighboring area wireless quality measurement results, a reason for failure of random access process (e.g., an initial attempt failed, no resources available, maximum number of attempts reached), a Msg2 PDCCH or Msg2 not being decoded or recovered correctly (e.g., due to the coverage level not being suitable), a failure in Msg4 conflict resolution, or whether a resource conflict has been detected.

Reporting the Radio Link Failure (RLF) related measurement record report information includes at least one of the following: the source cell ID at RLF, RLF occurrence time, whether the RSRP of the source cell occurs when the RLF occurs, and whether the RRC connection re-establishment is triggered when the RLF occurs. It may further include one or more of the target cell ID when RLF is re-established, RSRP of target cell when RLF is re-established, a length of time that the RLF did not detect the synchronization information, the number of dedicated PDCCH repetitions when RLF occurs, and a type of RLF occurrence (e.g., early RLF or legacy RLF).

Idle mode data transmission related measurement record reporting information based on pre-configured resources includes one or more records, which contain at least one of the following: the cell information of the data transmission in the idle mode over the pre-configured resource, a reason for the a transmission failure, an indication of the data transmission failure, the number of attempts of data transmission, the number of data transmission repetitions, and a resource type used for data transmission.

In some embodiments, the cell information includes at least one of the following: Cell Global Identity (CGI) or Physical Cell Identity (PCI), a frequency of the cell (anchor carrier frequency), or cellular radio quality (RSRP, RSRQ or CEL).

MIB and/or SIB acquisition duration related measurement record reporting information includes one or more records, which contain at least one of a time when the UE camps on the cell identifier and a time when the UE acquires the MIB and/or the SIB.

The multicast service receiving performance related measurement record includes one or more records, which contain at least one of the following: the receiving time of the multicast service reception, the number of packets successfully received by the multicast service, the duration of receiving the multicast service, an indication that the control channel is received but the traffic channel is not detected, the number of packets received by the control channel, and the number of packets received by the traffic channel.

Example 3. In some embodiments, and in the context of Example 1, before the UE reports the measurement results to the base station, the base station may configure the UE to perform a network maintenance related measurement initiation strategy (e.g., a start-up procedure for measurement recordation, etc.). This initiation strategy (or policy) may be configured along with the SIB configuration and/or Radio Resource Control (RRC) messages.

Example 4. In some embodiments, and in the context of Example 3, the measurement initiation policy is configured along with an SIB configuration. In doing so, it distinguishes (or characterizes) a UE type, and includes at least one of the following: an indication of whether a non-stationary UE performs measurement reporting, whether a terminal that can charge or replace the battery continues to measure and report, and whether a low-power terminal reports.

Example 5. In some embodiments, and in the context of Example 3, the measurement initiation policy is configured by an RRC message, where the RRC message includes at least one of the following: RRCConnectionSetup, RRCConnectionResume, RRCConnectionReestablishment, RRCConnectionReconfiguration, RRCConnectionReject, RRCConnectionRelease, and RRCEarlyDataComplete messages.

Example 6. In some embodiments, and in the context of Example 3, the measurement initiation policy is included in the SIB configuration and the RRC message accompanying the SIB configuration. In an example, the SIB configuration measures related public parameters and the RRC configuration measurement activates and reports related UE-specific parameters.

Example 7. In some embodiments, and in the context of Example 3, the UE configuring network maintenance related measurements includes at least one of the following measurement types:

UE mobility related measurement report;

RACH performance related measurement report;

RLF related measurement report;

Idle mode based on pre-configured resource data transmission related measurement report;

MIB and/or SIB acquisition duration correlation measurement report; and

Multicast service receiving performance related measurement report.

Example 8. In some embodiments, and in the context of Example 3, the measurement configuration includes at least one of the following: a maximum size for all the measurement records (e.g., a maximum number of bits or a maximum number of records) and a measurement amount (RSRP, RSRQ and/or CEL) reporting indication, the maximum size for each of the measurement records (e.g., maximum number of bits).

Example 9. In some embodiments, and in the context of Example 3, the UE configuration network maintenance related measurement includes at least one of the following measurement reporting methods:

A periodic report;

An event-based report;

A follow-up report during the establishment of service; and

A follow-up indication during the establishment of service of whether the measurement record exists in the UE. For example, the eNB may determine whether the record needs to be reported based on the indication.

Example 10. In some embodiments, and in the context of Example 9, the measurement records are periodically reported. For example, the eNB configures a measurement reporting period or a reporting interval for the UE, and if the UE has a measurement record when the reporting period expires, the related measurement record information is reported.

In some embodiments, the reporting is triggered by an event. For example, when UE generates a measurement record, or the number of the measurement records reaches a maximum allowable number of records, the UE actively reports the relevant measurement record information. In one example, this may be achieved by the eNB configuring a ProhibitTimer for the UE such that the UE starts the ProhibitTimer after reporting a record, and no new measurement records will be reported until ProhibitTimer expires.

In some embodiments, the messaging during the reporting of the measurement record in the service establishment process includes the relevant measurement record information.

In some embodiments, an indication of whether the measurement record exists is carried in one of the messages as part of the service establishment process. For example, the eNB determines, according to the indication, whether the UE needs to report the measurement record, and the eNB sends a measurement record report request to the UE and allocates (or authorizes) an uplink resource. This is followed by the UE transmitting the uplink measurement record on the authorized uplink resource.

Example 11. In some embodiments, and in the context of Example 10, the UE transmits the relevant measurement record information as part of the service establishment process, and does so in Msg3 of the EDT process or Msg5 of the non-EDT process.

In some embodiments, the UE may transmit an indication of whether or not to report the presence or absence of the measurement record information as part of the service establishment process. For example, the indication may include one or more of the following:

Whether the UE mobility related measurement report exists;

Whether the RACH performance related measurement report exists;

Whether the RLF related measurement report exists;

Whether the idle mode based on pre-configured resource data transmission related measurement report exists;

Whether the MIB and/or SIB acquisition duration correlation measurement report exists; and Whether the multicast service receiving performance related measurement report exists.

Example 12. In some embodiments, and in the context of Example 11, the eNB sends a measurement record reporting request to the UE, which include at least one of the following:

Report all measurement records;

Report UE mobility related measurement records;

Report RACH performance related measurement records;

Report RLF related measurement records;

Report idle mode based on pre-configured resource data transmission related measurement records;

Report MIB and/or SIB acquisition duration related measurement records; and

Report measurement performance measurement records related to multicast service reception performance.

The examples described above may be incorporated in the context of the methods described below, e.g., methods 1000 and 1100, which may be implemented at a network device (e.g., base station, gNB, eNB, etc.) or a terminal (e.g., UE, mobile device, smartphone, etc.)

FIG. 10 shows an example of a wireless communication method 1000 for measurement reporting for network maintenance. The method 1000 includes, at step 1010, transmitting, to a network device and based on a trigger, a maintenance message comprising measurement records associated with at least one of a data transmission on a pre-configured resource during idle mode, a master information block (MIB) acquisition duration or a system information block (SIB) acquisition duration, or a performance of a multicast service reception. In some embodiments, the trigger is based on a periodic reporting schedule, an occurrence of an event, or an establishment of a wireless communication with the network device.

Another exemplary method for wireless communication includes transmitting, to a network device and based on a trigger, a maintenance message comprising measurement records associated with at least one of a mobility of the terminal, a random access channel (RACH) performance or a radio link failure (RLF), where the trigger is based on a periodic reporting schedule, an occurrence of an event, or an establishment of a wireless communication with the network device.

In some embodiments, method 1000 may further include receiving, from the network device, an indication to perform a network maintenance strategy to generate the measurement records. In an example, the indication is received in an SIB configuration message or a radio resource control (RRC) message. In some embodiments, the indication is received in an SIB configuration message that identifies a type of the terminal and comprises at least one of an indication of whether the terminal performs the transmitting, an indication of whether the terminal can continue the network maintenance strategy upon determining that the terminal is charging or an indication of whether the terminal report a low-power status. In other embodiments, the indication is received in a radio resource control (RRC) message that comprises at least one of a RRCConnectionSetup message, a RRCConnectionResume message, a RRCConnectionReestablishment message, a RRCConnectionReconfiguration message, a RRCConnectionReject message, a RRCConnectionRelease message or a RRCEarlyDataComplete message.

Figure 11:
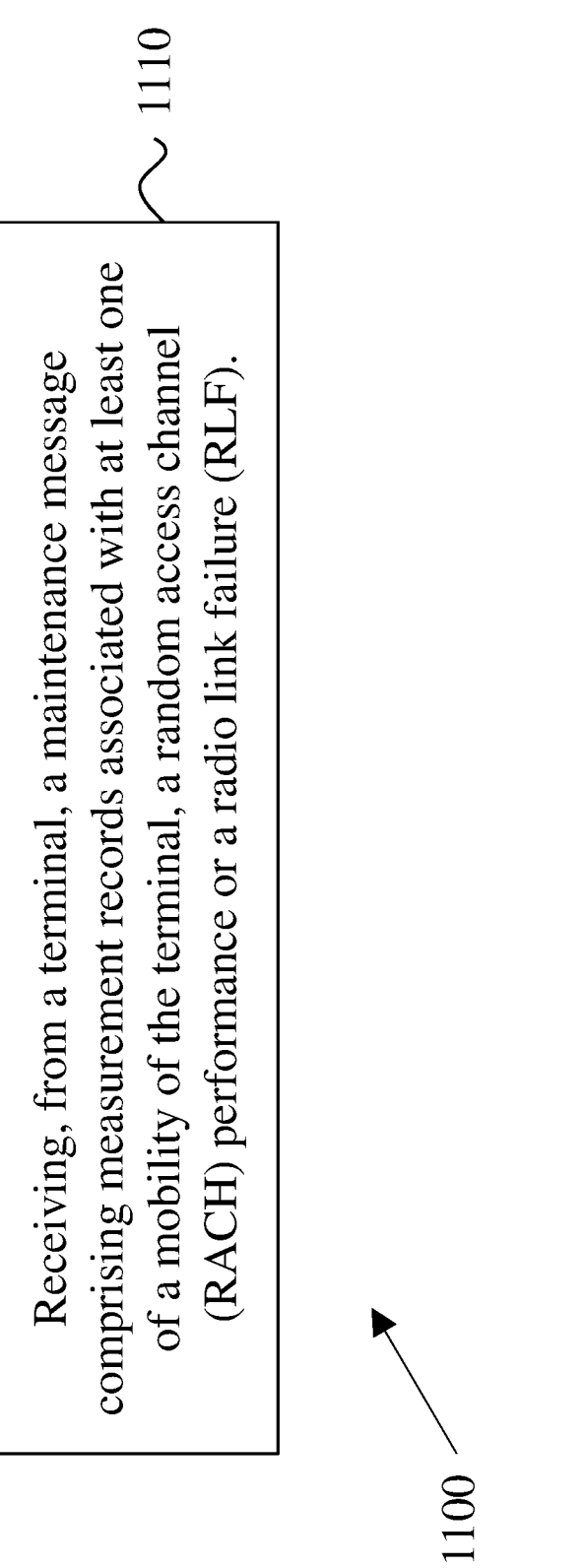
FIG. 11 shows another example of a wireless communication method, in accordance with some embodiments of the presently disclosed technology.

FIG. 11 shows an example of a wireless communication method 1100 for measurement reporting for network maintenance. The method 1100 includes, at step 1110, receiving, from a terminal, a maintenance message comprising measurement records associated with at least one of a mobility of the terminal, a random access channel (RACH) performance or a radio link failure (RLF).

Yet another exemplary method for wireless communication includes receiving, from a terminal, a maintenance message comprising measurement records associated with at least one of a data transmission on a pre-configured resource during idle mode, a master information block (MIB) acquisition duration or a system information block (SIB) acquisition duration, or a performance of a multicast service reception.

In some embodiments, the method 1100 further includes transmitting, to the terminal, an indication to perform a network maintenance strategy to generate the measurement records. In an example, the indication is transmitted in an SIB configuration message or a radio resource control (RRC) message.

In some embodiments, the method 1100 further includes transmitting, to the terminal, a request to send the measurement records associated with at least one of a data transmission on a pre-configured resource during idle mode, a master information block (MIB) acquisition duration or a system information block (SIB) acquisition duration, a performance of a multicast service reception, a mobility of the terminal, a random access channel (RACH) performance or a radio link failure (RLF).

The methods described above advantageously provide a more comprehensive set of information (e.g., measurement records and results) that enable the UE in NB-IoT systems to report their idle mode behaviors in an energy-efficient manner.

In some embodiments, the trigger is further based on an indication of an existence of the measurement records.

In some embodiments, and in the context of at least method 1100, the measurement records associated with the mobility of the terminal include a cell reselection process information and a cell residence information. In one example, the cell reselection process information includes a cell reselection time or a cell information that corresponds to a source cell information and a target cell information. In another example, wherein the cell information comprises at least one of a cell global identity (CGI), a physical cell identity (PCI), a cell-specific frequency, a cell radio quality or whether a random access failure has occurred prior to the cell reselection process. In yet another example, the cell residence information comprises a duration of a stay of the terminal in the cell.

In some embodiments, and in the context of at least method 1100, the measurement records associated with the RACH performance comprise at least one of a radio quality of a cell, an initial transmit power of the terminal for a random access procedure, a cell ID for the random access procedure, a time when the random access procedure occurred, or a preamble resource type. In other embodiments, the measurement records associated with the RLF comprise at least one of an occurrence time of the RLF, a duration of time over which synchronization information was not detected by the terminal, dedicated physical downlink control channel (PDCCH) repetitions when the RLF occurred, an early RLF indication or a type of the RLF.

In some embodiments, and in the context of at least method 1000, the measurement records associated with the data transmission on the pre-configured resource during idle mode comprise at least one of a cell information for the data transmission, a failure indication of the data transmission, a number of attempts of the data transmission, a number of repetitions of the data transmission or a resource type used for the data transmission. In one example, the cell information for the data transmission includes at least one of a cell global identity (CGI), a physical cell identity (PCI), a cell-dependent frequency or a cell quality.

In some embodiments, and in the context of at least method 1000, the measurement records associated with the MIB acquisition duration or the SIB acquisition duration comprise a time when the terminal camps on a cell or a time when the terminal acquires the MIB or the SIB.

In some embodiments, and in the context of at least method 1000, the measurement records associated with the performance of the multicast service reception comprise at least one of a time of reception, a number of packet received by the multicast service, a duration of the multicast service, an indication that a control channel is received but a traffic channel is not, a number of packets received over the control channel or a number of packets received over the traffic channel.

Implementations for the Disclosed Technology

Figure 12:
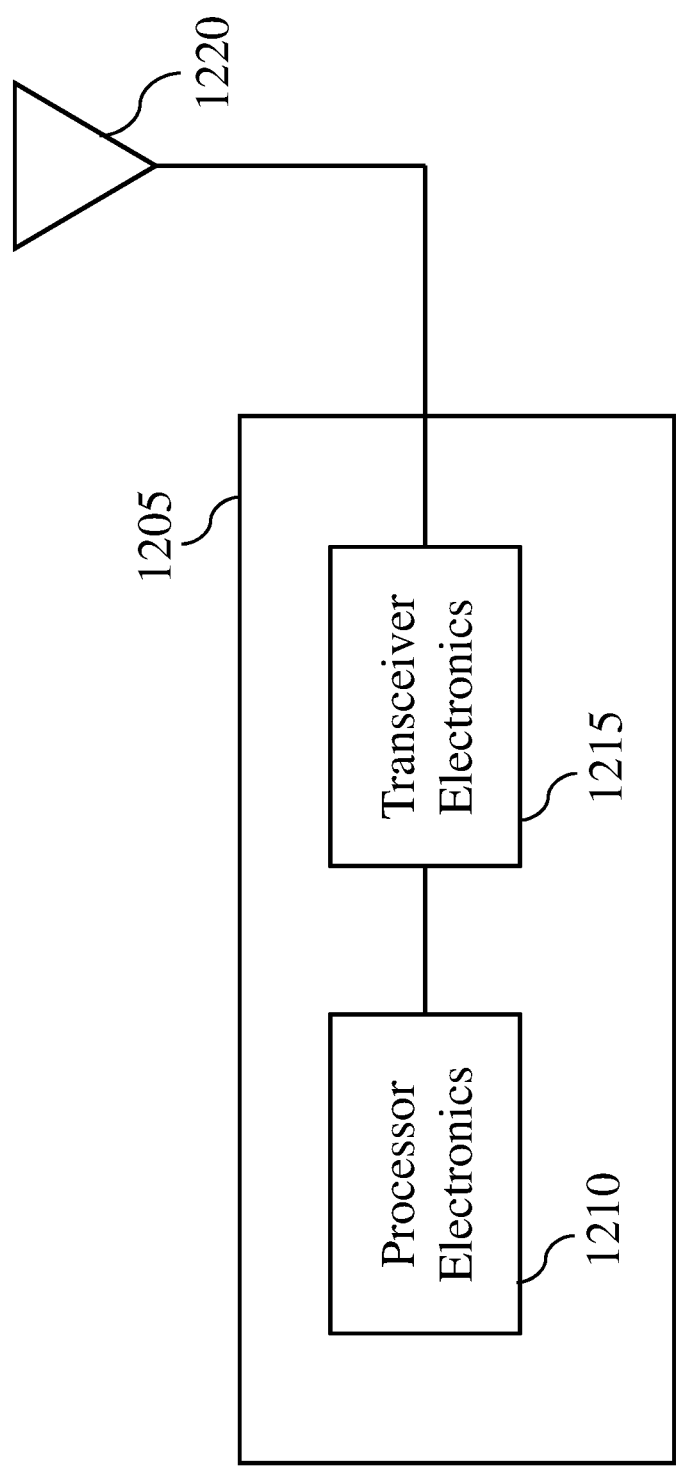
FIG. 12 is a block diagram representation of a portion of an apparatus, in accordance with some embodiments of the presently disclosed technology.

FIG. 12 is a block diagram representation of a portion of an apparatus, in accordance with some embodiments of the presently disclosed technology. An apparatus 1205, such as a base station or a wireless device (or UE), can include processor electronics 1210 such as a microprocessor that implements one or more of the techniques presented in this document. The apparatus 1205 can include transceiver electronics 1215 to send and/or receive wireless signals over one or more communication interfaces such as antenna(s) 1220. The apparatus 1205 can include other communication interfaces for transmitting and receiving data. Apparatus 1205 can include one or more memories (not explicitly shown) configured to store information such as data and/or instructions. In some implementations, the processor electronics 1210 can include at least a portion of the transceiver electronics 1215. In some embodiments, at least some of the disclosed techniques, modules or functions are implemented using the apparatus 1205.

It is intended that the specification, together with the drawings, be considered exemplary only, where exemplary means an example and, unless otherwise stated, does not imply an ideal or a preferred embodiment. As used herein, the use of "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method for wireless communication, implemented at a terminal operating in a narrowband internet-of-things (NB-IoT) system, the method comprising:

receiving, by the terminal, from a network device, a first indication to perform a network maintenance strategy to generate measurement records, the first indication including a measurement type, wherein the measurement type indicates whether a measurement reporting is associated with at least one of a mobility of the terminal, a random access channel performance, or a radio link failure, and wherein the first indication is received in a RRC message that comprises a RRCConnectionRelease message;

transmitting a Msg3 of an Early Data Transmission (EDT) process including a second indication of an existence of the measurement records generated by the terminal in response to receiving of the first indication, the Msg3 further including a data volume size of the measurement records;

receiving, from the network device, a request to send the measurement records associated with at least one of the mobility of the terminal, the random access channel performance or the radio link failure; and transmitting, to the network device and based on a trigger, the measurement records associated with at least one of the mobility of the terminal, the random access channel performance or the radio link failure, wherein the trigger is based on an occurrence of an event.

2. The method of claim 1, wherein the trigger is further based on the second indication of an existence of the measurement records.

3. The method of claim 1, wherein the measurement records associated with the random access channel performance comprise at least one of a radio quality of a cell or a preamble resource type.

4. A method for wireless communication, implemented at a network device, the method comprising:

transmitting, from the network device to a terminal operating in a narrowband internet-of-things (NB-IoT) system, a first indication to perform a network maintenance strategy to generate measurement records, the first indication including a measurement type, wherein the measurement type indicates whether a measurement reporting is associated with at least one of a mobility of the terminal, a random access channel performance, or a radio link failure, and wherein the first indication is transmitted in a RRC message that comprises a RRCConnectionRelease message;

receiving a Msg3 of an Early Data Transmission (EDT) process including a second indication of an existence of the measurement records generated by the terminal in response to receiving of the first indication, the Msg3 further including a data volume size of the measurement records;

transmitting, from the network device, a request to send the measurement records associated with at least one of the mobility of the terminal, the random access channel performance or the radio link failure; and receiving, from the terminal, the measurement records associated with at least one of the mobility of the terminal, the random access channel performance or the radio link failure.

5. The method of claim 4, wherein the measurement records associated with the random access channel performance comprise at least one of a radio quality of a cell or a preamble resource type.

6. A wireless communication apparatus comprising:

at least one processor and a memory;

wherein the at least one processor is configured to read code from the memory, which, when executed by the at least one processor, causes the wireless communication apparatus operating as a terminal to implement a method including:

receiving, by the terminal, from a network device, a first indication to perform a network maintenance strategy to generate measurement records, the first indication including a measurement type, wherein the measurement type indicates whether a measurement reporting is associated with at least one of a mobility of the terminal, a random access channel performance, or a radio link failure, and wherein the first indication is received in a RRC message that comprises a RRCConnectionRelease message;

transmitting a Msg3 of an Early Data Transmission (EDT) process including a second indication of an existence of the measurement records generated by the terminal in response to receiving of the first indication, the Msg3 further including a data volume size of the measurement records;

receiving, from the network device, a request to send the measurement records associated with at least one of the mobility of the terminal, the random access channel performance or the radio link failure; and transmitting, to the network device and based on a trigger, the measurement records associated with at least one of the mobility of the terminal, the random access channel performance or the radio link failure, wherein the trigger is based on an occurrence of an event.

7. The wireless communication apparatus of claim 6, wherein the trigger is further based on the second indication of an existence of the measurement records.

8. The wireless communication apparatus of claim 6, wherein the measurement records associated with the random access channel performance comprise at least one of a radio quality of a cell or a preamble resource type.

9. A wireless communication apparatus comprising:

at least one processor and a memory, wherein the at least one processor is configured to read code from the memory, which, when executed by the at least one processor, causes the wireless communication apparatus to implement a method including:

transmitting, to a terminal operating in a narrowband internet-of-things (NB-IoT) system, a first indication to perform a network maintenance strategy to generate measurement records, the first indication including a measurement type, wherein the measurement type indicates whether a measurement reporting is associated with at least one of a mobility of the terminal, a random access channel performance, or a radio link failure, and wherein the first indication is transmitted in a RRC message that comprises a RRCConnectionRelease message;

receiving a Msg3 of an Early Data Transmission (EDT) process including a second indication of an existence of the measurement records generated by the terminal in response to receiving of the first indication, the Msg3 further including a data volume size of the measurement records;

transmitting a request to send the measurement records associated with at least one of the mobility of the terminal, the random access channel performance or the radio link failure; and receiving, from the terminal, the measurement records associated with at least one of the mobility of the terminal, the random access channel performance or the radio link failure.

10. The wireless communication apparatus of claim 9, wherein the measurement records associated with the random access channel performance comprise at least one of a radio quality of a cell or a preamble resource type.

11. The method of claim 1, wherein the trigger is based on the occurrence of the event that a number of the measurement records reaches a maximum allowable number.

12. The wireless communication apparatus of claim 6, wherein the trigger is based on the occurrence of the event that a number of the measurement records reaches a maximum allowable number.

* * * * *